Figure 1:
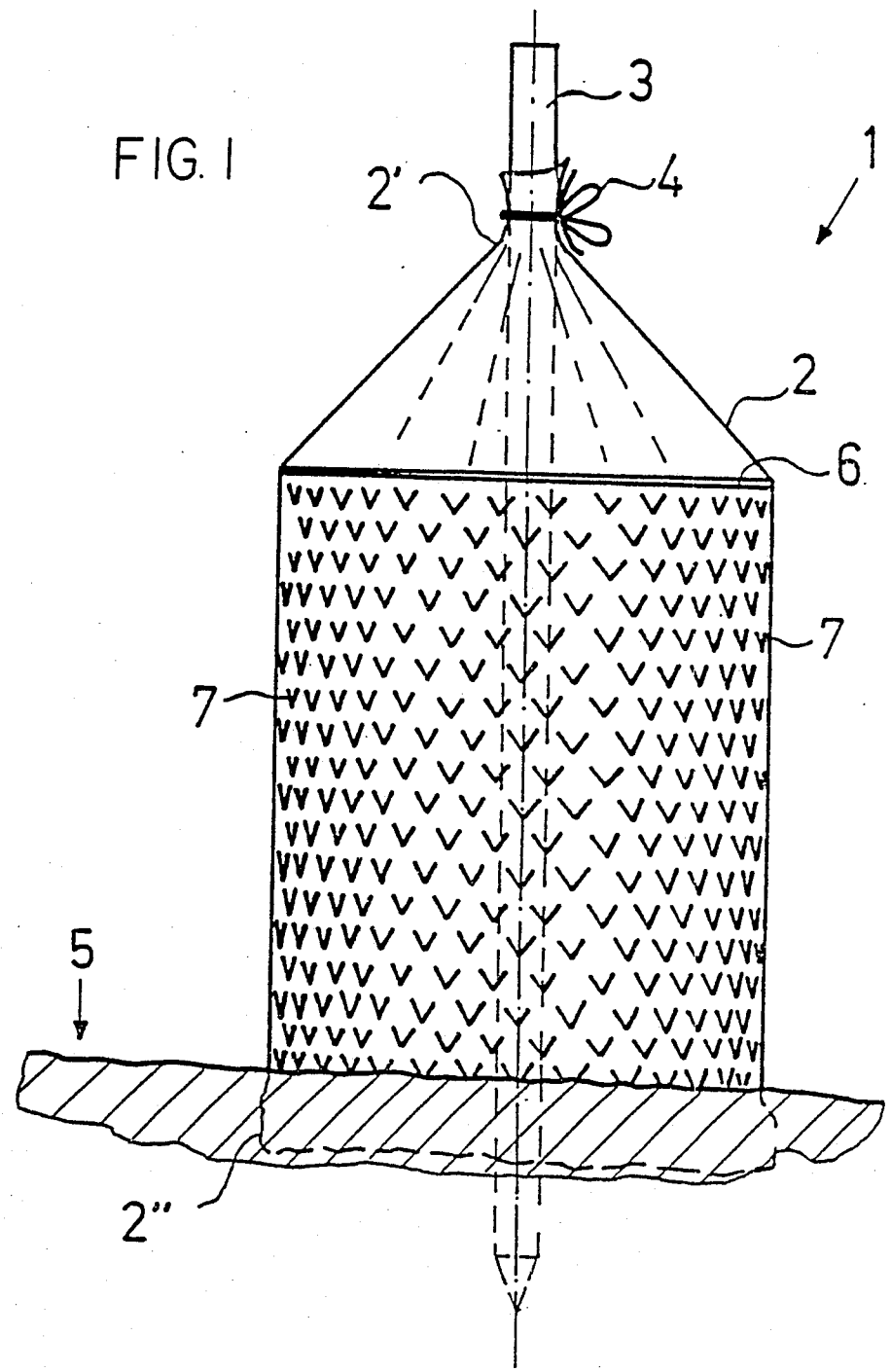

United States Patent [19]

Tesch

[11] Patent Number: 4,815,236
[45] Date of Patent: Mar. 28, 1989

[54] PROTECTIVE HOOD FOR THE GROWING OF CULTIVATED PLANTS

[76] Inventor: Günter H. Tesch, Avenue Jean-Marie-Musy 15, Fribourg, Switzerland, CH-1700

[21] Appl. No.: 23,559
[22] PCT Filed: May 16, 1986
[86] PCT No.: PCT/EP86/00295
§ 371 Date: Feb. 27, 1987
§ 102(e) Date: Feb. 27, 1987
[87] PCT Pub. No.: WO86/06929
PCT Pub. Date: Dec. 4, 1986

[30] Foreign Application Priority Data

May 21, 1985 [CH] Switzerland ............... 2166/85

[51] Int. Cl.⁴ .............................. A01G 13/02
[52] U.S. Cl. ............................. 47/29; 47/20
[58] Field of Search ............ 47/29, 20, 21, 22, 26, 47/28, 32; 135/98, 99

[56] References Cited

FOREIGN PATENT DOCUMENTS

| | | |
|---|---|---|
| 1782150 | 7/1971 | Fed. Rep. of Germany . |
| 2647398 | 5/1977 | Fed. Rep. of Germany . |
| 1512100 | 2/1968 | France . |
| 5231 | 5/1874 | Italy ........................ 47/26 |
| 491253 | 7/1970 | Switzerland ............... 47/20 |
| 634458 | 2/1983 | Switzerland . |
| 617074 | 2/1949 | United Kingdom ........ 47/26 |
| 937427 | 9/1963 | United Kingdom ........ 47/29 |

Primary Examiner—Richard J. Johnson
Attorney, Agent, or Firm—Bacon & Thomas

[57] ABSTRACT

A protective hood for the growing of cultivated plants to be raised on supports, such as stakes, sticks or the like, is described, said hood consisting of a sleeve provided with slit-like orifices, one end of the sleeve being optionally fastened to the support and the other end secured on or in the ground. As in the case of the known protective hoods the penetration of the water into the hood cannot be controlled, it is proposed to design the protective hood in a manner such that the sleeve (2) comprises V or scale shaped slits (7). If these slits (7) are arranged in rows and the slits (7) of adjacent rows are offset relative to each other, the slits may be opened by the plant or manually. Due to the specific layout of the protective hood, the fishplates (8) or scales remaining between the legs of the V-shaped slits are always curving to the outside. Depending on the manner in which the sleeve is being used, i.e. in which direction the fishplates or scales are pointing—downward or upward—the water running down the hood is either prevented from entering the protective hood or guided into said hood.

8 Claims, 2 Drawing Sheets

FIG. I

PROTECTIVE HOOD FOR THE GROWING OF CULTIVATED PLANTS

The invention concerns a protective hood for the raising of cultivated plants to be raised on supports, such as stakes, sticks or the like, in particular tomato plants, according to the preamble of claim 1.

A protective hood of this generic type is known from DE-A-2 647 398. This protective hood comprises a sleeve provided with slit like orifices, one end of which may be fastened to the support and the other end secured on or in the ground. This sleeve comprises elongated, straight slits. The slits are located in one form of embodiment of the known protective hood transversely to the sleeve and thus to the support, while in another form of embodiment they are parallel to them.

The starting material for the manufacture of the protective sleeve according to the invention comprises a sheet material made of an inexpensive, plant compatible, non-toxic plastic, for example, a high pressure (low density) polyethylene, which is processed by conventional sheet blowing methods into a sleeve. The diameter of the sleeve is controlled by the circumference of the plant to be protected. This leads to widths of the sleeves in the flat state of 40 to 80 cm. Depending on the diameter of the sleeve, the wall thickness may also be varied, for example, from 30 to 100 $\mu$m. To prepare the protective sleeves, suitable lengths are cut from the sheet. The cutting process is conveniently left to the user on the site of the plants. In this case, the starting material for the preparation of the protective sleeves is supplied in the form of a rolled-up or zig-zag folded sheet with a length that is a multiple of the length of the individual protective sleeves. The length actually required may then be cut from the sheet. To facilitate the cutting process and in particular for use in the covering of plants of a uniform type, the sheet may be provided by the manufacturer with regularly spaced weakening lines, cut transversely to the longitudinal direction. Optionally, weld beads extending adjacent to said weakening lines may also be provided, with said beads serving as the upper closure of the protective sleeves.

The elongated slits are located in rows parallel to each other, in which the slits are also extending, and the slits of adjacent rows are offset relative to each other. If the sleeve is stretched transversely to the longitudinal direction of the slits, the webs located between the slits of adjacent rows are twisted and the slits are deformed into lens shaped orifices. Depending on the extent of the elongation the orifices created are of different sizes.

During the growth of the plants, whereby the volume of the plants becomes larger, the plant rests against the inside of the protective hood and stretches the sleeve, whereby the individual slits are gradually opened in keeping with the growth of the plant.

By means of the gradual opening of the slits into lens shaped orifices due to the growth of the plants, the internal space of the protective hood under which the plant is located, is becoming increasingly connected with the environment of the protective hood through the sleeve.

Known protective hoods of this type have been found to be useful in themselves.

If, in particular during the terminal phase of the growth of the plants, in particular tomato plants, there are heavy rains, it may occur that the plants do not developing an optimal manner as they receive too much water, while the shoots particularly of tomato plants, should not receive any water at all during this period. As the slits located between the webs are straight, the twisting of the webs cannot be predetermined. According to probability, one-half of the webs may be twisted to the extent that the water running from the protective hood, in particular rain water, flows inside the protective hood. The tomato plants are thus becoming wet.

It is therefore the object of the invention to provide a protective hood of the abovementioned generic type, wherein the twisting of the webs located between the slits may be controlled even in the case of the gradual opening so that in particular water may be prevented from entering into the protective hood in a controlled manner, but that the entry of the water may be made possible if desired.

This object is attained by the invention. The protective hood of the invention is characterized by that the sleeve comprises slits of a V-shaped or scale-like configuration. A sleeve of this type of a protective hood is secured to a support, for example a stake, so that the slits are facing downward with their points or their curvatures, while the upper end of the sleeve is secured, for example tied to the stake. In the area of this fastening to the stake to shortly below it, the sleeve may be without orifices. In this zone the rain water cannot enter into the protective hood at all. The area below this zone has the V or scale shaped slits, with the point of said slits being directed downward and the free ends of the legs of the slits pointing upward and the curvatures downward. In this case water running down the protective hood cannot penetrate the protective hood even if the slits are open, as said slits are either closed or the fishplate or scale forming between the legs is curving to the outside. If, however, the slits are aligned in the inverse direction, i.e. with their points or curvatures pointing upward, the water running down the protective hood flows into the protective hood. This effect may be utilized if as much water as possible is to the introduced into the hood, but the plant is to be protected against the direct impact of rain drops, particularly in the case of so-called cloud bursts.

The slits are arranged on rows parallel to each other, with the slits of adjacent rows being offset relative to each other, so that zigzag shaped rows of webs are present between the rows of slits.

If now the sleeve is secured both to the stake on top and on the bottom on or above the ground and the growing plant stretches the sleeve in particular transversely to the extent of the stake, the slits open and the fishplate or scales forming between the two legs of each V-shaped slis are curving outward.

During the growth of the plants the sleeve is gradually expanding and consequently the opening of the slits also takes place gradually.

The expansion of the sleeve may also be obtained by moving the upper fastening location on the stake upwards, thereby extending the sleeve longitudinally.

The sleeve may also be fastened by means of cords or the like secured on the ground, if the lower end of the sleeve is spaced apart from the ground.

As seen from the above, the same sleeve, particularly if it comprises zones without slits on both ends, may be used both to keep water out of the protective hood or to introduce it in a controlled manner into said hood, by simply reversing the sleeve, i.e. placing the end that is usually the lower one on top, as the fishtails or curvatures between the webs always open to the outside and thus may serve for example as collector pockets.

Further details and advantages of the invention will become apparent from the dependent claims and the examples of embodiment described below with reference to the drawing.

In the drawing:

FIG. 1 shows a protective hood fastened to a stake, in a lateral elevation, and

Figure 2:
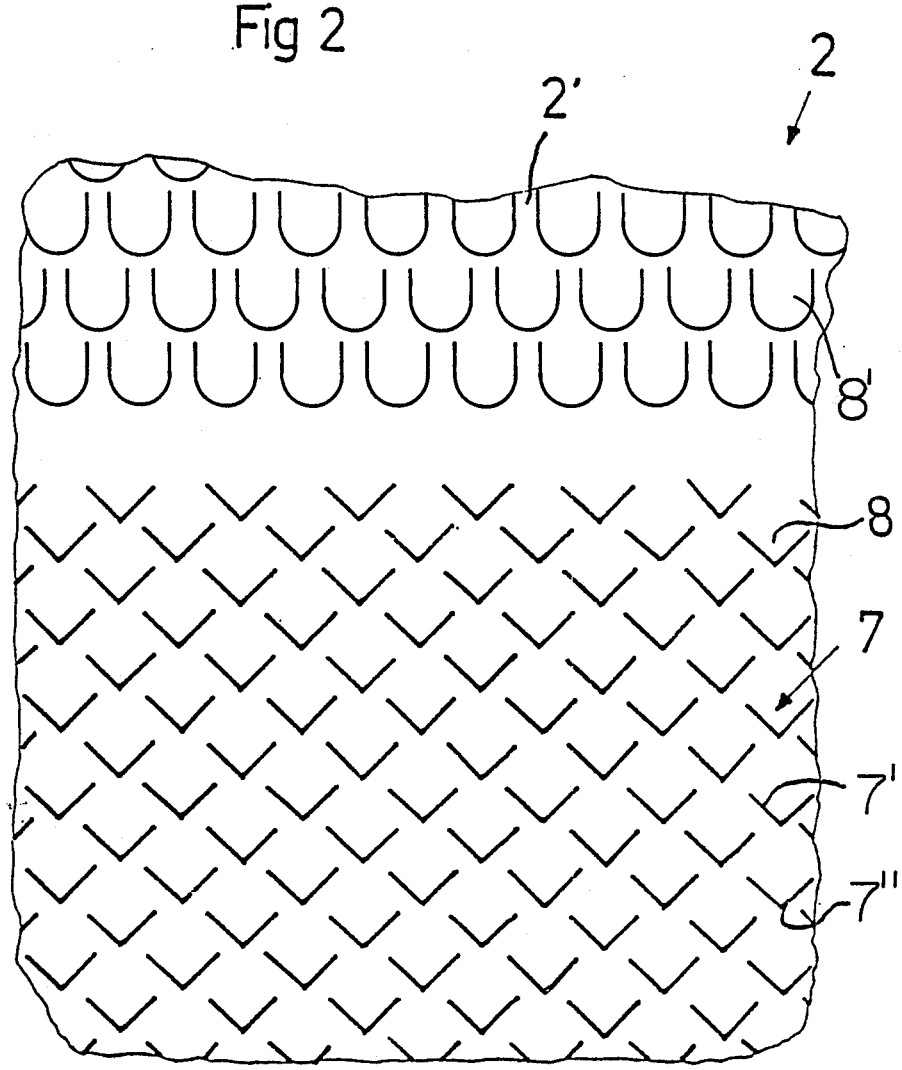

FIG. 2 an enlarged section of a sleeve used as the protective hood and laid out flat.

FIG. 1 shows a protective hood 1, consisting of a sleeve 2, tied together and fastened with its upper end 2' to a support, in this case a stake 3, for example by means of a cord 4.

The lower end 2" of the sleeve 2 is here buried in the soil 5.

Spaced apart from the upper end 2' fastened to the stake 3 of the sleeve 2, here a supporting device, for example a support ring 6, is arranged in the sleeve 2, which is being held by means of cords or wires, not shown, on the stake 3 in the vertical direction. The support ring 6 spreads the sleeve 2 out to its "ground diameter", even if the plant has not yet grown to this size.

The sleeve 2 is solid in the area of one end—here between the upper fastening location of the sleeve 2 on the stake 3 and the support ring 6—i.e. there are no perforations or orifices.

According to a form of embodiment not shown, a corresponding area at the other end 2" of the sleeve 2 is also free of perforations.

Between these two areas or outside one area according to the form of embodiment of FIG. 1, the sleeve 2 is provided with slits 7, which according to the figures, in particular FIG. 2, are V-shaped.

According to a further form of embodiment, not shown, in place of the V-shaped slits 7, a plurality of scale like slits are provided, the free ends of which are in the same locations as the free ends of the legs 7' of the V-shaped slits 7 and the curvature of which is aligned as is the fishplate 8 located between the legs 7'.

The V-shaped slits 7 are arranged in parallel rows, with said rows being aligned parallel to the longitudinal axis of the sleeve 2. The slits 7 of adjacent rows are offset with respect to each other. Webs remain between the slits 7. As the result, there is a row of successive webs between the rows of slits 7, with the latter row having a zigzag configuration.

Further parallel rows of slits 7 and webs are present perpendicularly to the longitudinal axis, as shown particularly by FIG. 2, with the rows of webs again having a zigzag like configuration. On these rows of webs, the fishplates 8 remaining between the legs 7' of the slit 7 arranged; they are shown in the figures "hanging" in the downward direction.

The legs 7' of the V-shaped slit 7 include among them an angle, which here amounts to approximately 90°. The legs 7' of one row, here both the vertical and the horizontal rows, are now aligned and arranged so that a straight line placed through them intersects the other leg 7' of the slit 7 of an adjacent row, spaced apart from its point 7". This distance corresponds to approximately one-fourth of the length of the legs 7' and may amount conveniently to between one-third and one-fifth of this length.

The distance of the free end of a leg 7' of a slit 7 of one row from the adjacent leg 7' of the next slit 7 of an adjacent row amounts here to about one-half of the length of a leg.

The sleeve 2 may now be expanded in different manners so that the slits open up. The plants growing inside the protective hood 1 may apply a transverse expansion to the sleeve 2, whereupon longitudinal contraction takes place. It is however, also possible to expand the sleeve 2 longitudinally by the axial displacement of the upper end 2' of the sleeve 2 on the stake 3. This expansion twists the webs, thereby stressing them. The fishplates between the legs 7' of the V-shaped slits 7 or the scales of scale-like slits are, however not stressed. As the sleeve is in the form of a hollow cylinder, the fishplates 8 or 8' the scales always curve to the outside.

Due to the offset of the slits 7, water running down the protective hood 1 drips, if the fishplates 8 are pointing downward as shown in FIG. 1, from one curving fishplate 8 to the next and cannot penetrate into the sleeve 2.

If, however, the fishplates 8 are directed upward, i.e. inversely to the configuration in FIG. 1, the fishplates 8 curving outward and pointing in the upward direction, capture the water running down and introduce it into the sleeve 2. Such a configuration may be particularly important in dry areas.

According to a form of embodiment not shown, the sleeve may be spread by means of three or more rods inserted into the ground, so that the sleeve is being held around a plant to be raised, without actually touching the plant.

Depending on the configuration of the sleeve and in particular the weight by unit area of the sheet, the slit may also open merely by gravity.

I claim:

1. A protective hood for the growing of cultivated plants to be raised on supports, such as stakes, sticks or the like comprising a sleeve provided with slit-like orifices, one end whereof may be fastened to the support and the other end secured on or in the ground, wherein the sleeve comprises a plurality of V or scale like slits, the V like slits comprising two legs intersecting in a point to form the V and wherein the free ends of the legs of the V not intersecting in the point, or the scale shaped slits, are pointing toward one end of the sleeve and the point or the curvature of the V or scale shaped slits are directed toward the other end of the sleeve.

2. Protective hood according to claim 1, characterized in that the angle between the legs (7") of the V-shaped slits (7) amounts to approximately 90°.

3. Protective hood according to claim 1, characterized in that the V or scale shaped slits (7) are aligned in rows parallel to the longitudinal axis of the sleeve (2) and that the slits (7) of adjacent rows are offset relative to each other.

4. Protective hood according to claim 1, characterized in that a straight line laid through one leg (7') of a V-shaped slit (7) intersects the leg (7') approximately perpendicular to said straight line of a V-shaped slit (7) of the adjacent row, at a point spaced apart from the tip (7") of the second slit (7).

5. Protective hood according to claim 4, characterized in that said distance amounts to approximately one-third to one-fifth, preferably one-fourth of the length of said leg (7').

6. Protective hood according to claim 4, characterized in that the distance of the free end of one leg (7') from the other leg (7') of the adjacent slit (7) corresponds to approximately one-half of the length of the leg (7').

7. Protective hood according to claim 1, characterized in that at least in the area of one axial end (2') of the sleeve (2), to which the legs (7') of the V or scale shaped slits (7) are pointing, no slits (7) are provided.

8. Protective hood according to claim 7, characterized in that at both ends (2', 2") of the sleeve (2) areas of equal size are provided wherein there are no slits (7).

* * * * *